United States Patent [19]

Gage et al.

[11] Patent Number: 6,155,135
[45] Date of Patent: Dec. 5, 2000

[54] DRIVE UNIT WITH LUBRICANT COOLING COVER

[75] Inventors: Garrett W. Gage, Goodrich; Joseph M. Endreszl, Westland, both of Mich.

[73] Assignee: American Axle & Manufacturing, INC., Detroit, Mich.

[21] Appl. No.: 09/197,779

[22] Filed: Nov. 23, 1998

[51] Int. Cl.$^7$ .................................................. F16H 57/04
[52] U.S. Cl. ........................ 74/606 A; 184/104.1; 165/47
[58] Field of Search ...................... 74/606 A; 184/104.1; 165/47, 170, 168

[56] References Cited

U.S. PATENT DOCUMENTS

| | | | |
|---|---|---|---|
| 1,318,706 | 10/1919 | Talbot | 74/606 A |
| 2,147,391 | 2/1939 | Acker | 74/606 A |
| 4,002,200 | 1/1977 | Raskin | 165/170 |
| 4,066,121 | 1/1978 | Kleine et al. | 165/170 |
| 4,074,590 | 2/1978 | Jorg | 74/606 A |
| 4,932,469 | 6/1990 | Beatenbough | 165/170 |
| 5,072,784 | 12/1991 | Stenlund | 74/606 A |
| 5,540,300 | 7/1996 | Downs et al. | 184/104.1 |
| 5,737,922 | 4/1998 | Schoenman et al. | 165/168 |

*Primary Examiner*—David A. Bucci
*Assistant Examiner*—Chong H. Kim
*Attorney, Agent, or Firm*—Reising, Ethingtin, Barnes, Kisselle, Learman & McCulloch, P.C.

[57] ABSTRACT

A final drive unit for a motor vehicle has a differential gear set rotationally mounted in a gear housing that has a rearward facing cover. The differential gear set includes a differential case driven by a ring gear. The ring gear dips into lubricant in the bottom of the gear housing and pumps a portion of the lubricant through a lubricant cooling passage in the cover having a plurality of vertical parallel open ended conduits connected to a manifold having an inlet at the bottom of the cover.

6 Claims, 2 Drawing Sheets

DRIVE UNIT WITH LUBRICANT COOLING COVER

This invention relates generally to an automotive drive unit and more particularly to an automotive final drive unit with a lubricant cooling cover.

BACKGROUND OF THE INVENTION

The rear wheels of a rear drive automobile are driven by a final drive unit that splits the torque received from a longitudinal propeller shaft between the two rear wheels by means of a differential gear set inside a gear housing of the final drive unit. The propeller shaft drives an internal pinion gear that drives an internal ring gear attached to a rotary differential case. The differential case supports equalizing gears that drive two side gears that are attached to drive shafts that are connected to the respective rear wheels.

The bottom of the gear housing is a reservoir that is filled with lubricant that is distributed to the various differential gears during operation of the final drive unit. This lubricant can become quite hot. Consequently, a final drive unit often has lubricant cooling provisions.

European Patent Application 0 067 639 published Dec. 22, 1982 discloses an axle that includes a final drive unit that has a gear housing and a removable cover member. The cover member and an intermediate member provide an internal chamber that has an opening at the top. Lubricant is thrown into the internal chamber through the top opening by the rotating ring gear during operation of the final drive unit. The internal chamber also has an opening at the bottom of the intermediate member that is sufficiently small so that the chamber remains substantially full of lubricant during operation of the final drive unit. Cooling of the lubricant is facilitated by heat conduction through the wall of the removable cover member. The wall may be provided with cooling fins.

SUMMARY OF THE INVENTION

The object of this invention is to provide a final drive unit having a removable cover that provides an improved lubricant cooling arrangement.

A feature of the invention is that the removable cover divides the lubricant delivered by the ring gear for flow through several parallel lubricant cooling conduits.

Another feature of the invention is that the removable cover has several lubricant cooling conduits that are partially formed by embossments in an outer shell of the cover to increase the wall area of the lubricant cooling conduits that is exposed to cooling ambient air.

Still another feature of the invention is that the removable cover has several parallel lubricant cooling channels that are configured to equalize flow rates through the several lubricant cooling channels.

These and other objects, features and advantages of the invention will become more apparent from the following description of a preferred embodiment taken in conjunction with the accompanying drawing.

DESCRIPTION OF THE PREFERRED EMBODIMENT

Figure 1:
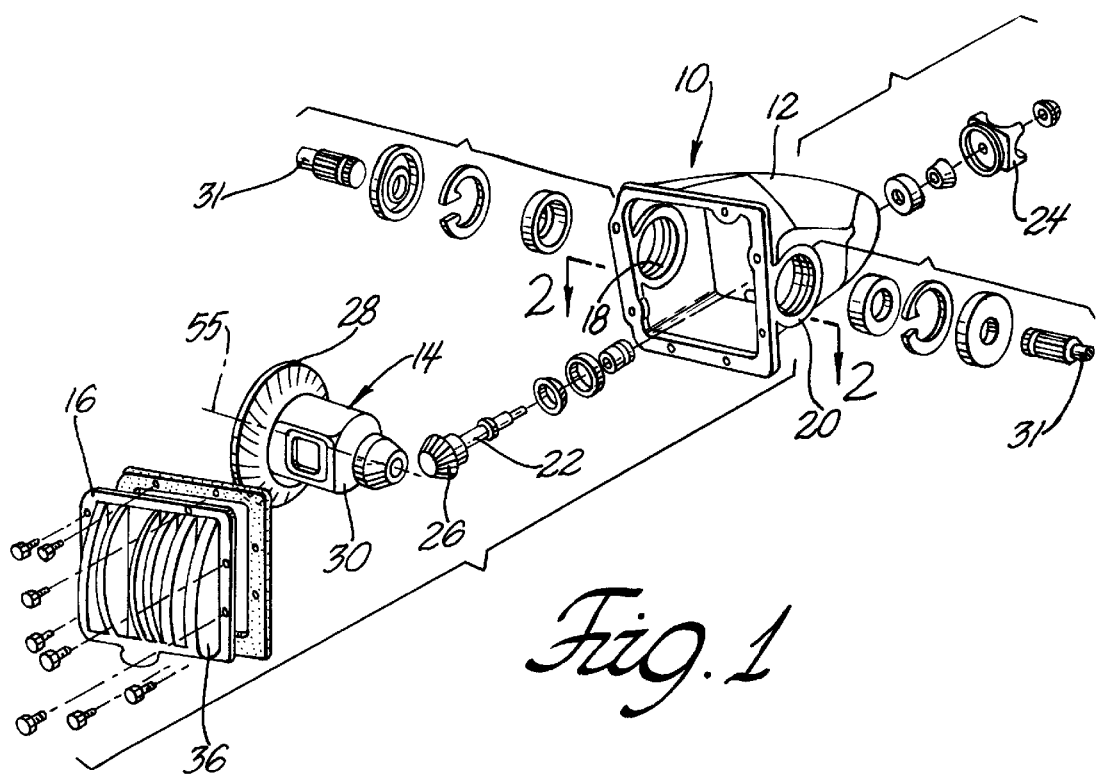
FIG. 1 is an exploded perspective rear view of a final drive unit equipped with a removable cover that provides a lubricant cooling arrangement according to the invention.
Figure 2:
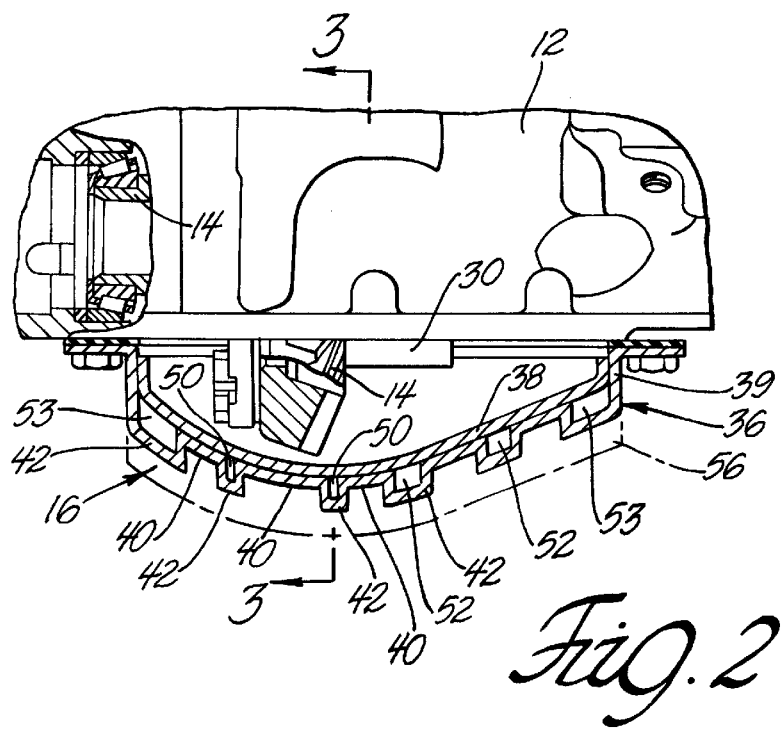
FIG. 2 is section taken substantially along the line 2—2 of FIG. 1 looking in the direction of the arrows.

Referring now to the drawing, a final drive unit 10 of the invention comprises a gear housing 12, a differential gear assembly 14 that is rotatably mounted in the gear housing 12 and a removable cover 16. The gear housing 12 has journal openings 18 and 20 in opposite sides of the gear housing 12. These journal openings include bearing seats for rotatably mounting the differential gear assembly 14 inside the gear housing 12 as best shown in FIG. 2.

The differential gear assembly 14 is drivingly connected to an engine driven propeller shaft (not shown) by a rotary stub shaft 22 that extends through a journal opening in the front of the gear housing 12 (not shown). Stub shaft 22 has a yoke 24 at the outside end for connecting the stub shaft 22 to the propeller shaft by a conventional Cardan type universal joint (not shown). Stub shaft 22 has a pinion gear 26 at the inside end that drives a ring gear 28 of the rotary differential gear assembly 14.

The differential gear assembly 14 is a conventional bevel gear differential of the type that is customarily used in automotive final drives, particularly in final rear drives. A bevel gear differential operates in a well known manner so that its operation need not be described in detail for those skilled in the art to understand the invention. Suffice it to say that the ring gear 28 is attached to and rotates a differential case 30 in one direction or the other whenever the vehicle is in motion. The rotary differential case 30 houses equalizing gears that mesh with side gears that are attached to the inner ends of drive shafts 31.

The differential gear assembly 14 is installed in the gear housing 12 through a large rear opening that is conventionally closed by a removable cover after the differential gear assembly 14 is installed. The removable cover 16 of final drive unit 10 provides an improved lubricant cooling arrangement as explained below.

When cover 16 is attached to gear housing 12, a lubricant reservoir 32 is formed inside the gear housing 12. This reservoir is filled with lubricant 34 to a predetermined fill level so that ring gear 28 forming part of the rotary differential assembly 14 is partially emersed in lubricant 34 in lubricant reservoir 32 as best shown in FIG. 3.

As indicated above, the meshing gears of the differential gear assembly 14 are constantly rotating when the vehicle is in motion, particularly the ring gear 28 and the pinion gear 26 that drives ring gear 28. This constant working of the meshing gears during vehicle operation, along with other internal frictions, produces heat that raises the temperature of lubricant 34 in lubricant reservoir 32. The final drive unit 10 of the invention includes a lubricant cooling system that reduces operating temperature of lubricant 34.

This lubricant cooling system comprises a lubricant cooling passage that is formed in removable cover 16. Cover 16 comprises an outer shell 36 that is fastened to gear housing 12 and an inner shell 38 that nests in the outer shell 36 as best shown in FIG. 2. Outer shell 36 has a peripheral wall 39 and several lands 40 that engage inner shell 38 (FIG. 3) and a fork-like embossment 42 (FIG. 4) that cooperate with inner shell 38 to form the lubricant cooling passage of the invention.

Figure 3:
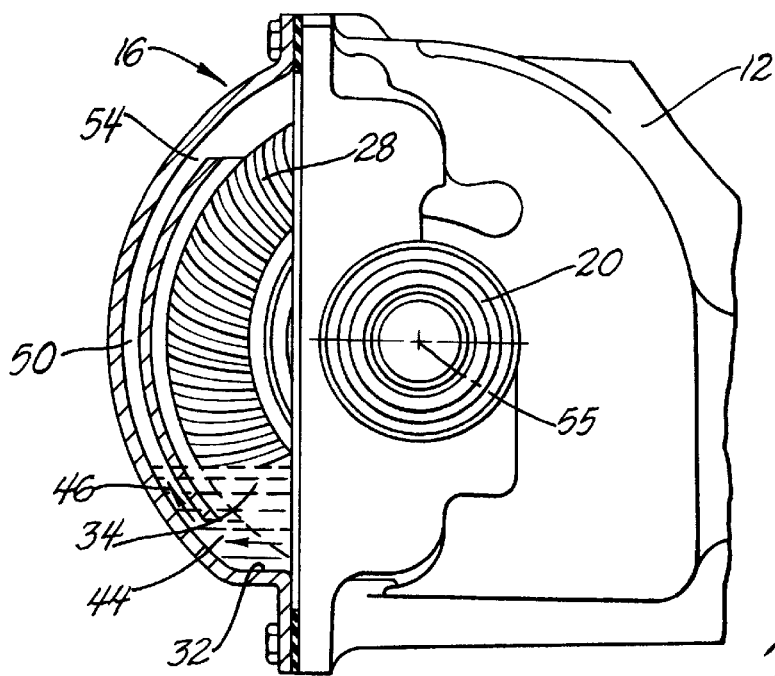
FIG. 3 is a section taken substantially along the line 3—3 of FIG. 2 looking in the direction of the arrows.

The lubricant cooling passage commences with an inlet 44 that is aligned with rotary ring gear 28 so that ring gear 28 pushes lubricant into the cooling passage via inlet 44 as indicated by the arrows 46 when ring gear 28 rotates in the clockwise direction as viewed in FIG. 3. Inlet 44 is preferably as near the bottom of cover 16 as possible.

Figure 4:
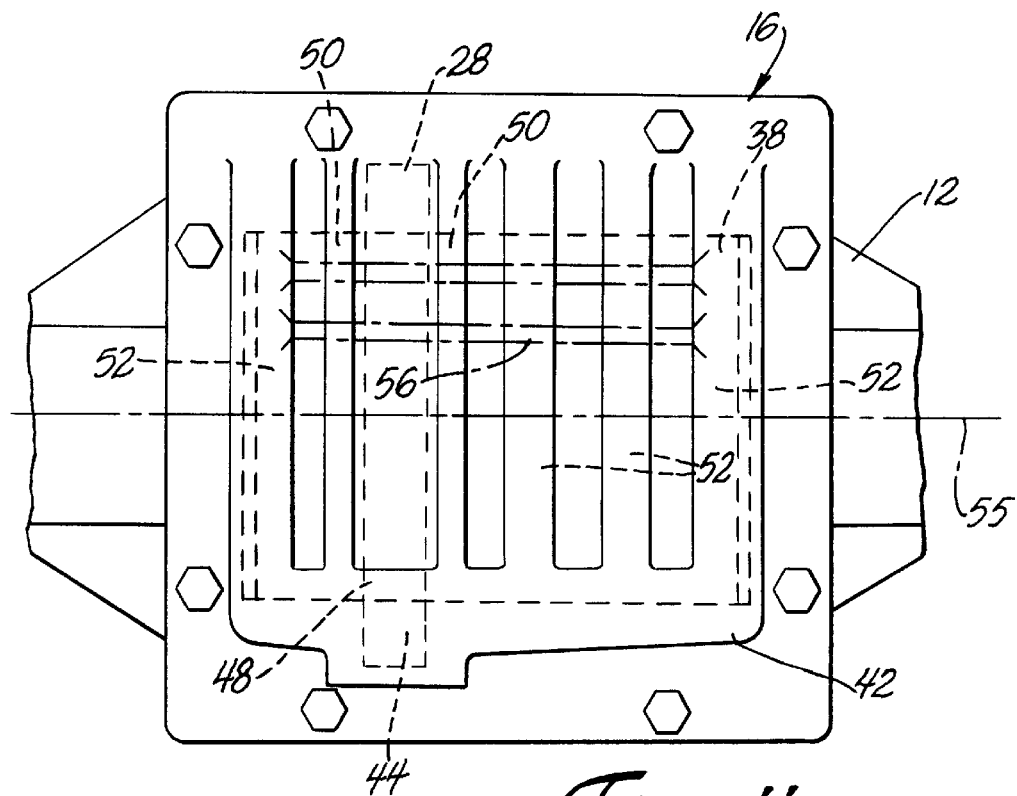
FIG. 4 is a rear view of the final drive unit shown in FIGS. 1, 2 and 3.

Inlet 44 communicates with a horizontal manifold 48. Manifold 48 is just above inlet 44 and preferably extends for substantially the entire width of the drive unit 10 as best shown in FIG. 4. Manifold 48 in turn communicates with a plurality of laterally spaced, vertical conduits 50, 52, 53. Vertical conduits 50, 52, 53 are preferably all spaced laterally of ring gear 28 while vertical conduits 50 on either side of ring gear 28 preferably have a smaller cross section than intermediate conduits 52. End conduits 53 also preferably have a larger cross section than intermediate conduits 52. These relationships, as best seen in FIG. 2, promote a more even distribution of the lubricant supplied from manifold 48 amongst the several vertical conduits 50, 52, 53. Moreover, the cross section sizes can be adjusted to substantially equalize the flow through the several conduits 50, 52, 53.

Vertical conduits 50, 52, 53 each extend from manifold 48 to an outlet 54 that is located well above inlet 44, manifold 48 and the lubricant 34 in reservoir 32. Outlets 54 are preferably located above axis 55 of the differential gear assembly 14 and as high as possible without restricting flow through the outlets to any appreciable degree so as to maximize their height and consequently the cooling effect of vertical conduits 50, 52, 53.

During operation, ring gear 28 pushes lubricant from reservoir 32 into the lubricant cooling passage via inlet 44 where the manifold 48 of the lubricant cooling passage divides the lubricant 32 amongst the several vertical conduits 50, 52, 53 of the lubricant cooling passage. Lubricant flows up conduits 50, 52, 53 and out through several outlets 54 and then returns to reservoir 32 by gravity flow. It should be noted that the majority of the manifold 48 and the conduits 50, 52, 53 forming the lubricant cooling passage of the invention are formed by walls constituting part of the fork-like embossment 42 of the outer shell 48. Consequently, the hot lubricant is not only divided into smaller parcels for cooling but the hot lubricant also flows through a lubricant cooling passage that is mostly exposed to ambient cooling air for improved heat transfer by conduction. Thus the removable cover 16 provides a very efficient radiator for cooling the lubricant in drive unit 10. Moreover, the cooling can be further enhanced by incorporating optional cooling fins 56 on the exterior of outer shell 48 that extend crosswise of the vertical cooling conduits 50, 52, 53 as shown in FIG. 4. Any number of vertically spaced cooling fins 56 can be used. The shells 36 and 38 of cover 16 may be a steel or aluminum sheet metal stamping or an aluminum or aluminum alloy casting.

The removable cover 16 of the invention with its improved cooling arrangement has been illustrated in conjunction with a final drive unit 10 of the type that is used in independent suspensions. The removable cover 16 of the invention is particularly useful in such a drive unit because of a heat transfer area limited to the confines of the gear housing 12 and cover 16. However, the removable cover of the invention can also be used with final drive units that are part of an axle assembly that includes axle tubes extending out the sides of the gear housing that can also be used for heat transfer.

Obviously, many modifications and variations of the present invention in light of the above teachings may be made. It is, therefore, to be understood that, within the scope of the appended claims, the invention may be practiced otherwise than as specifically described.

We claim:

1. A final drive unit having a gear housing, a cover attached to the gear housing forming a lubricant reservoir in the gear housing, a rotatable member forming part of a gear assembly rotatably mounted in the gear housing, the rotatable member having a lower portion that is emersed in lubricant in the lubricant reservoir and a lubricant cooling system, the lubricant cooling system comprising:

a lubricant cooling passage in the cover in fluid communication with the lubricant reservoir via an inlet that is exposed to lubricant in the lubricant reservoir, the inlet being near the bottom of the cover and aligned with the rotatable member so that lubricant flows into the lubricant passage when the rotatable member rotates, and the lubricant cooling passage having a manifold just above the inlet and a plurality of laterally spaced vertical conduits that extend from the manifold to outlets that are located completely above the inlet and the manifold and above the axis of the rotatable member whereby lubricant flowing into the lubricant cooling passage is divided amongst the plurality of laterally spaced vertical conduits before the lubricant is returned to the reservoir through the outlets.

2. A final drive unit having a gear housing, a cover attached to the gear housing forming a lubricant reservoir in the gear housing, a ring gear forming part of a differential gear assembly rotatably mounted in the gear housing, the ring gear having a lower portion that is emersed in lubricant in the lubricant reservoir and a lubricant cooling system, the lubricant cooling system comprising:

the cover having a outer member and an inner member forming a lubricant cooling passage in the cover in fluid communication with the lubricant reservoir via an inlet that is exposed to lubricant in the lubricant reservoir, the inlet being disposed with respect to the ring gear so that lubricant flows into the lubricant cooling passage when the ring gear rotates, and the lubricant cooling passage having a horizontal manifold connected to the inlet and a plurality of laterally spaced vertical conduits leading from the manifold to outlets located well above the inlet, the manifold and the lubricant in the lubricant reservoir whereby lubricant flowing into the lubricant passage is divided into a plurality of separate cooling paths before the lubricant is returned to the reservoir, the plurality of laterally spaced vertical conduits all being spaced laterally of the ring gear, and the manifold and the laterally spaced vertical conduits being partially formed by embossment in the outer member of the cover to increase the wall area of the manifold and the vertical conduits that is exposed to external cooling ambient air, wherein the manifold and the laterally spaced vertical conduits are partially formed by a fork shaped embossment in the outer cover.

3. A final drive unit having a gear housing, a cover attached to the gear housing forming a lubricant reservoir in the gear housing, a ring gear forming part of a differential gear assembly rotatably mounted in the gear housing, the ring gear having a lower portion that is emersed in lubricant in the lubricant reservoir and a lubricant cooling system, the lubricant cooling system comprising:

the cover having a outer member and an inner member forming a lubricant cooling passage in the cover in fluid communication with the lubricant reservoir via an inlet that is exposed to lubricant in the lubricant reservoir, the inlet being disposed with respect to the ring gear so that lubricant flows into the lubricant cooling passage when the ring gear rotates, the lubricant cooling passage having a horizontal manifold connected to the inlet and a plurality of vertical conduits leading from the manifold to outlets located well above the inlet, the manifold and the lubricant in the lubricant reservoir whereby lubricant flowing into the lubricant passage is divided into a plurality of separate cooling paths before the lubricant is returned to the reservoir, the manifold and the vertical conduits being partially formed by embossment in the outer member of the cover to increase the wall area of the manifold and the vertical conduits that is exposed to external cooling ambient air, and the plurality of vertical conduits including vertical conduits on either side of the ring gear that have a smaller cross section than the rest of the vertical conduits.

4. A final drive unit having a gear housing, a cover attached to the gear housing forming a lubricant reservoir in the gear housing, a ring gear forming part of a differential gear assembly rotatably mounted in the gear housing, the ring gear having a lower portion that is emersed in lubricant in the lubricant reservoir and a lubricant cooling system, the lubricant cooling system comprising:

the cover having a outer member and an inner member forming a lubricant cooling passage in the cover in fluid communication with the lubricant reservoir via an inlet that is exposed to lubricant in the lubricant reservoir, the inlet being disposed with respect to the ring gear so that lubricant flows into the lubricant cooling passage when the ring gear rotates, the lubricant cooling passage having a horizontal manifold connected to the inlet and a plurality of vertical conduits leading from the manifold to outlets located well above the inlet, the manifold and the lubricant in the lubricant reservoir whereby lubricant flowing into the lubricant passage is divided into a plurality of separate cooling paths before the lubricant is returned to the reservoir, the manifold and the vertical conduits being partially formed by embossment in the outer member of the cover to increase the wall area of the manifold and the vertical conduits that is exposed to external cooling ambient air, the plurality of vertical conduits all being spaced laterally of the ring gear, and the plurality of conduits including a first pair of conduits on either side of the ring gear, a second pair of conduits at respective ends of the cover and at least one intermediate conduit that has a cross section, the first pair of conduits having a cross section that is smaller than the cross section of the intermediate conduit and the second pair of conduits having a cross section that is larger than the cross section of the intermediate conduit.

5. A final drive unit having a gear housing, a cover attached to the gear housing forming a lubricant reservoir in the gear housing, a ring gear forming part of a differential near assembly rotatably mounted in the gear housing, the ring gear having a lower portion that is emersed in lubricant in the lubricant reservoir and a lubricant cooling system, the lubricant cooling system comprising:

the cover having a outer member and an inner member forming a lubricant cooling passage in the cover in fluid communication with the lubricant reservoir via an inlet that is exposed to lubricant in the lubricant reservoir, the inlet being disposed with respect to the ring gear so that lubricant flows into the lubricant cooling passage when the ring gear rotates, the lubricant cooling passage having a horizontal manifold connected to the inlet and a plurality of vertical conduits leading from the manifold to outlets located well above the inlet, the manifold and the lubricant in the lubricant reservoir whereby lubricant flowing into the lubricant passage is divided into a plurality of separate cooling paths before the lubricant is returned to the reservoir, the manifold and the vertical conduits being partially formed by embossment in the outer member of the cover to increase the wall area of the manifold and the vertical conduits that is exposed to external cooling ambient air, and cooling fins on an exterior of the outer shell that extend crosswise of the vertical conduits.

6. The final drive unit as defined in claim 2 wherein the outlets are located above the axis of the differential gear assembly.

* * * * *